US006181734B1

(12) United States Patent
Palermo

(10) Patent No.: US 6,181,734 B1
(45) Date of Patent: Jan. 30, 2001

(54) MULTIPLE WAVEFORM SOFTWARE RADIO

(75) Inventor: Keith Charles Palermo, Gilbert, AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/086,804

(22) Filed: May 29, 1998

(51) Int. Cl.[7] ........................................... H04B 1/38
(52) U.S. Cl. ........................................... 375/219; 375/220
(58) Field of Search ................................... 375/219, 223, 375/259, 280, 295, 300, 302, 316, 320, 322; 455/73, 84, 91, 102, 108, 130, 133, 140, 161.2, 164.2, 186.1, 403; 370/282

(56) References Cited

U.S. PATENT DOCUMENTS

| 5,771,229 | * | 6/1998 | Gavrilovich | 370/342 |
| 5,839,052 | * | 11/1998 | Dean et al. | 455/5.1 |
| 5,905,949 | * | 5/1999 | Hawkes et al. | 455/410 |
| 5,930,243 | * | 7/1999 | Parish et al. | 370/334 |
| 5,937,011 | * | 8/1999 | Carney et al. | 375/297 |
| 6,028,428 | * | 2/2000 | Cunningham et al. | 324/314 |
| 6,043,659 | * | 3/2000 | McKinnon | 324/322 |

FOREIGN PATENT DOCUMENTS

| 712213A2 | 5/1992 | (EP) | H04B/1/40 |
| 782358A2 | 7/1997 | (EP) | H04Q/7/32 |
| 9814023 | 4/1998 | (WO) | H04Q/7/32 |
| US9911734 | 5/1999 | (WO) . | |

* cited by examiner

Primary Examiner—Chi H. Pham
Assistant Examiner—Emmanuel Bayard
(74) Attorney, Agent, or Firm—Bradley J. Botsch, Sr.; Gregory J. Gorrie

(57) ABSTRACT

A radio is disclosed in which different waveforms may be utilized. The radio includes a memory (801) in which software (802, 805, 806) for specific waveforms is stored. The radio further includes one or more processors (807, 809, 811) which extract waveform specific software to process information for transmission or reception. All processing of the information between reception or reproduction of speech and transmission and reception of radio frequency signals, respectively, is performed in software.

12 Claims, 6 Drawing Sheets

MULTIPLE WAVEFORM SOFTWARE RADIO

BACKGROUND OF THE INVENTION

Commercial and military radios often need to communicate or could benefit by having the capability of communicating with two or more radio networks, each of which is of a different type. One example of this need is found in the cellular telephone market where different modes of operation are presently available leading to the present need for so-called "dual mode" cellular phones. The dual modes refer to different waveforms. As used herein, "waveform" refers to functional transformation of information such as speech to a modulated rf carrier and encompasses the entire process of going from speech to antenna and/or vice versa. To operate over multipole waveforms has in the past required that various pieces of equipment be utilized. As new waveform technologies develop, existing equipment becomes unusable with such waveforms.

It is desirable to provide a radio which is useable as a generic radio platform with existing waveforms and yet to be developed waveforms.

BRIEF DESCRIPTION OF THE DRAWING

The invention will be better understood from a reading of the following detailed description in conjunction with the drawing in which like reference designators indicate like elements in the various drawing figures, and in which.

DETAILED DESCRIPTION

The invention is directed to a software radio in which operation is, for the most part, effected by a software program that runs on a generic radio platform. Interoperable waveform modes are added as software applications in a manner similar to adding applications to a personal computer. In accordance with one aspect of the invention, the radio user or operator selects stored waveforms on demand as communications requirement dictate. As is described below, one embodiment of the invention utilizes nonvolatile storage to implement a plurality of waveforms. The operator may place one or more of the waveforms in cache random access memory such that rapid switching between the selected waveforms can occur. In addition, the operator may switch from one waveform mode to another to communicate over different radio networks, such as the Iridium satellite communication network manufactured by Motorola, Inc., TDMA and/or CDMA cellular networks, or other land mobile two-way radio systems such as the IDEN system by Motorola, Inc., or can broadcast on all or a number of them simultaneously.

Figure 1:
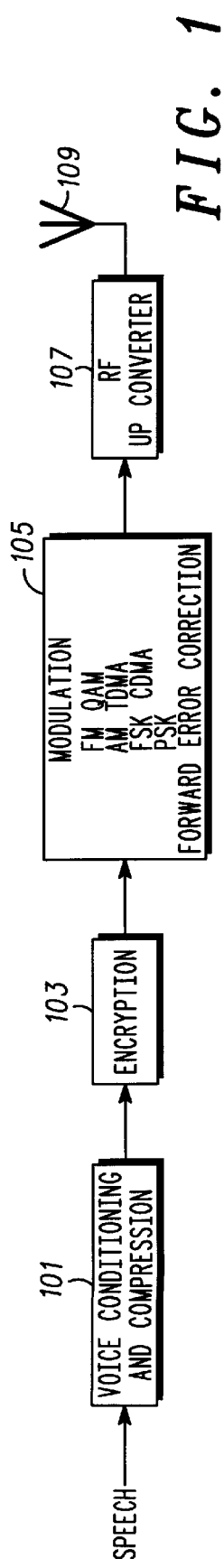
FIG. 1 is a functional diagram of a radio transmit path in accordance with the invention.

Turning now to FIG. 1, a functional flow diagram of a transmitter in accordance with the invention is shown. In the arrangement of FIG. 1, speech is applied to a voice conditioning function 101 that includes speech compression. In some instances, the waveform to be generated may not require compression in which event the speech compression portion of function 101 is not utilized. The conditioned and possibly compressed speech is subjected to an encryption function 103. The encrypted speech is provided to a modulation function 105. The modulation function provides any of a plurality of modulation types. The types of modulation which may be utilized includes frequency modulation (fm), amplitude modulation (am), frequency shift keying (fsk), phase shift keyed, (psk) quadrature amplitude modulation (qam), time division multiplexing (tdma), code division multiplexing (cdma) and other modulation functions. The various modulation types identified above are known, as are specifics with respect to the functionality of these and other modulation types. The modulation may be analog in nature or it may be digital. The modulation output is fed to a radio frequency (rf) up-conversion function 107. Function 107 utilizes the baseband modulation output of modulation function 105 and converts the baseband modulation to an rf carrier. Function 107 provides for selectable rf up-conversion and the resulting modulated rf carrier is applied to antenna 109. Although one antenna is shown, antenna 109 may include one or more antennas each of which is operable over one or more specific frequency bands.

Figure 2:
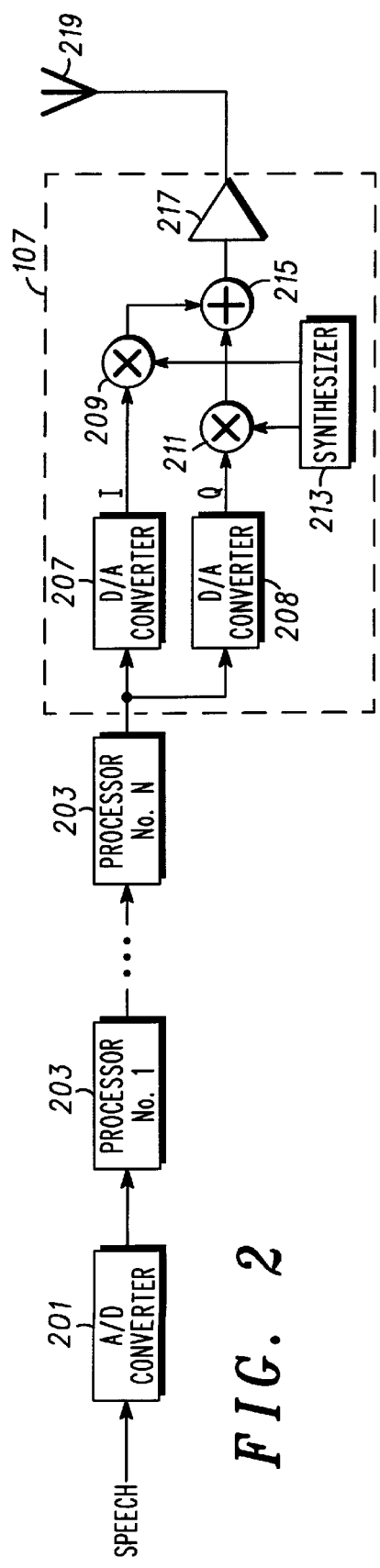
FIG. 2 is a partial block diagram of the transmit path of FIG. 1.

FIG. 2 illustrates in block diagram form an implementation of the transmitter of FIG. 1. Speech is applied to an analog to digital converter or digitizer 201 to produce digital information. All processing of the digital information is performed in software. The output of digitizer 201 is a digital data stream that enters one or more microprocessor blocks shown illustratively as processors 203. Any number of separate processors may be disposed between the two processors 203 shown to perform the various functions shown in the functional diagram of FIG. 1 such as voice conditioning and compression functions 101, encryption functions 103 and modulation functions 105. The output of the final or nth processor 203 is applied to a digital to an analog conversion block comprising digital to analog converters 207, 208. Each of digital to analog converters 207, 208 generates a baseband representation of the modulated signal in phase and quadrature components I and Q, respectively. I and Q are applied to respective mixers 209, 211. Mixers 209, 211 receive cosine and sine carrier signals generated by an rf synthesizer 213. The outputs of mixers 209, 211 are combined in adder 215 to produce a modulated rf signal which is applied to a power amplifier 217 to amplify the output signal to a desired level. The rf output of power amplifier 217 is applied to antenna 109.

In the transmitter of FIG. 2, each of processors 203 is utilized to provide a portion of the processing power needed to implement any desired waveform so that changing a waveform changes the software that processors 201 execute. Although multiple processors are shown, it will be understood by those skilled in the art that multiple processors, each specific to a waveform may be utilized in some embodiments of the invention. In other embodiments of the invention, multitasking of a fewer number of processors can accomplish the same result. In yet other embodiments of the invention, certain processors may be provided which are dedicated to the production of certain waveforms and other processors may be multitasked. In one implementation of the invention, the structure of FIG. 2 is replicated for each rf channel. The specific embodiment of FIG. 2 can operate to produce any one of several waveforms on a single rf channel. To accommodate additional channels the circuit of FIG. 2 may be replicated.

The analog to digital converters 201 are of conventional design and are of a type that is commercially available. Similarly, the processors 203 are commercially available processors such as the MPC860 available from Motorola, Inc. The rf up-converter 107 can be one of several commercially available rf up-converters.

Commercial transceivers include both transmit portions and receive portions. A receiver in accordance with the invention is shown in a functional diagram in FIG. 3. RF signals are received at antenna 301 which may be the same physical antenna as antenna 109 as shown in FIGS. 1 and 2 or may be a separate receive antenna. Alternatively, a common antenna may be used and conventional techniques and apparatus may be used to provide isolation between transmit and receive portions of a transceiver in accordance with the invention.

Signals are received by antenna 301 and down converted to baseband signals by rf down converter 303. A demodulation function 305 demodulates the baseband signals using any one of a plurality of modulation formats such as the various modulation formats described in conjunction with the modulation function 105 shown in FIG. 1. The modulation format utilized depends upon the particular modulation format employed by the particular waveform that is received. The demodulation function 305 outputs a demodulated data stream to decryption function 307 that performs the decryption, if any, required. The output of decryption function 307 is provided to voice decompression function 309 that decompresses the speech signals and provides a decompressed speech output. The functional diagram of FIG. 3 is for a single channel.

Figure 3:
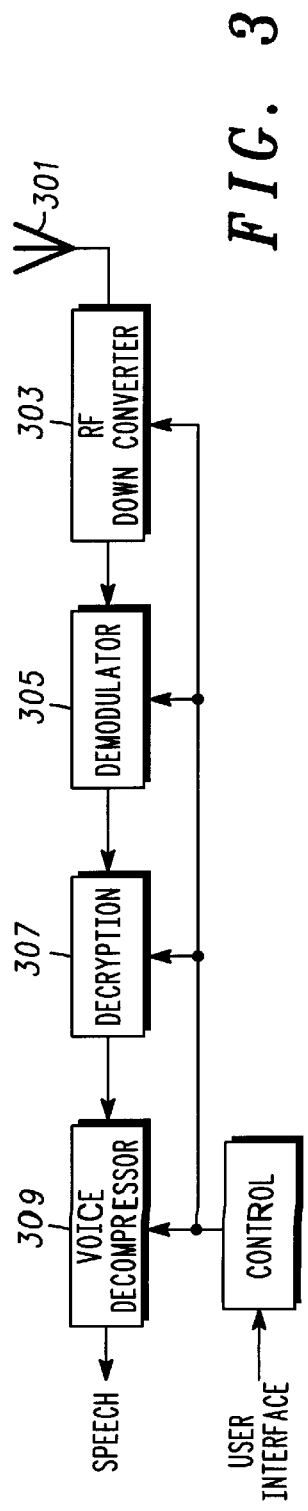
FIG. 3 is a functional diagram of a radio receive path in accordance with the invention.
Figure 4:
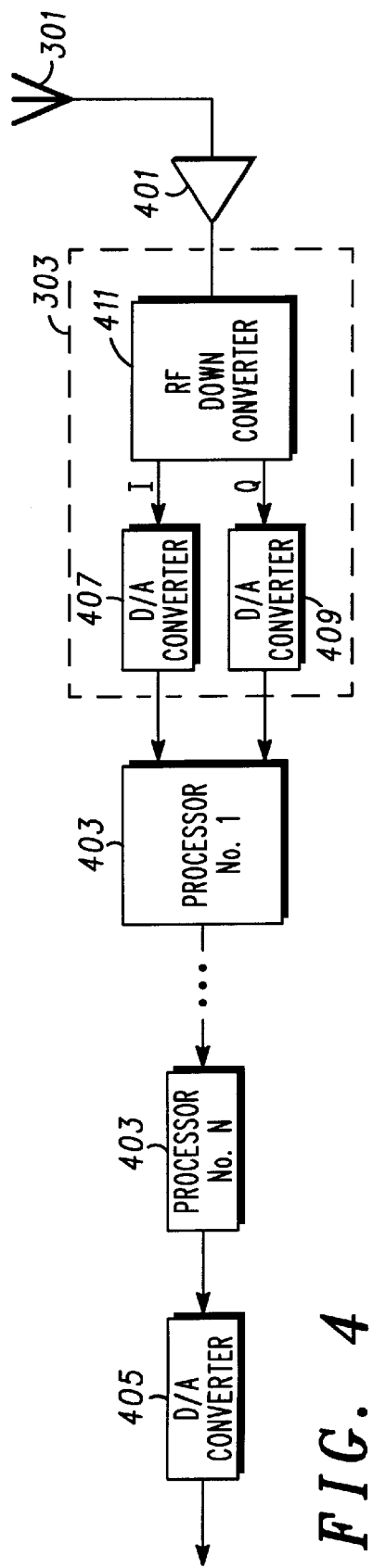
FIG. 4 is a partial block diagram of the receive path of FIG. 3.

FIG. 4 illustrates the receiver of FIG. 3 in block diagram form. RF signals are received at antenna 301 and may be amplified by a low noise amplifier (lna) 401 which is a conventional design, but ideally is of a broadband design. The output of lna 401 is applied to an rf down converter 303 which includes an rf down converter 411 of conventional design which for example generates phase and quadrature signals I and Q. The outputs I and Q are applied to analog to digital converters 407, 409 which are of conventional design. The I and Q outputs are applied to processors 403. The processors 403 provide the functions of demodulation 305, decryption 307 and voice decompression 309. Just as the processors 203 of FIG. 2 may be implemented as one or more processors, the processors 403 may similarly be one or more processors. The output of the processors 403 is a digital data stream that digital to analog converter 405 converts to analog speech signals. Multiple waveforms may be accomplished by executing different software routines in processors 403. The processors 403 may in a transceiver be included in processors 203.

Figure 5:
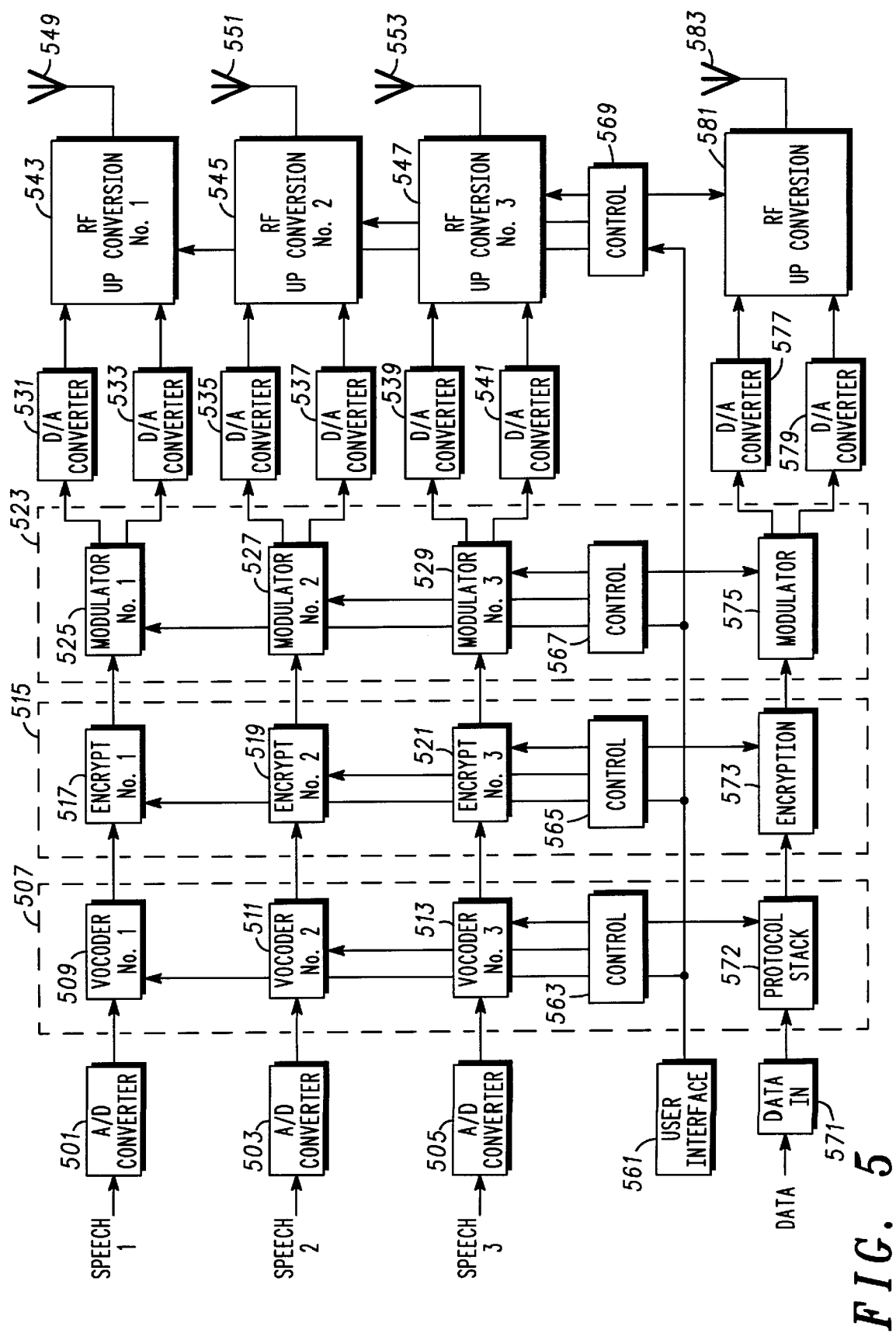
FIG. 5 is a block diagram of a transmit path of a second radio in accordance with the invention.

FIG. 5 illustrates an arrangement for the simultaneous transmission of a plurality of waveforms. In the arrangement shown four waveforms may be simultaneously transmitted over four rf channels. Those skilled in the art will appreciate that any number of waveforms may be simultaneously generated and transmitted by varying the number of channel paths from the four shown. The four rf channels are each similar to the single channel transmitter path of FIG. 1. Each of the four channels has a corresponding speech or data input, speech1, speech2, speech 3 and data. The speech inputs are coupled to analog to digital converters 501, 503, 505, respectively. The outputs of the analog to digital converters 501, 503, 505 are applied to a processor arrangement comprising processors 507, 515, 523. Processor 507 includes vocoder functionality to provide voice compression and other vocoder functionality. Processor 515 provides encryption functionality and processor 523 provides modulation functionality. The outputs of processor 523 need digital to analog converters 531, 533; and 535, 537; and 539, 541 that in turn provide base band quadrature signals to respective up converters 543, 545, 547 that are respectively connected to antennas 549, 551, 553. The speech inputs to the various channels may be derived from the same source such as a microphone or can come from a different source. The functions provided by processors 507, 515, 523 are implemented in software so that they can be selected dynamically, changed dynamically and the parameters of those functions are changeable dynamically. For example, the modulation bit rate and the modulation bandwidth are changeable dynamically. A user interface 561 is provided to permit the user of the transmitter to indicate, for example, that the user desires to communicate over a police VHF channel. The user interface is coupled to one or more control functions 563, 565, 567 which are in turn coupled functionally to the processors 507, 515, 523. The control functions 563, 565, 567 in turn control the operations of vocoder functions 509, 511, 513 encryptor functions 517, 519, 521 and modulation functions 525, 527, 529 respectively. In addition the control function 567 controls the operation of the rf up-converters 543, 545, 547.

The transmitter may also be used for the transmission of data over an rf channel. Data input is initially applied to a data interface 571 that is in turn coupled to functionalities in processors 507, 515, 523. Processor 507 includes a protocol stack 572 that provides various protocol conversions such a TCPIP for Ethernet conversions. Processor 515 includes encryption functionality 573 to encrypt the protocol-converted data from processor 507. The output of processor 515 in turn coupled to modulation functionality 575 of processor 523. Digital to analog converters 577, 579 provide in phase and quadrature signals to an rf up-converter 581 which transmits over antenna 583.

Figure 6:
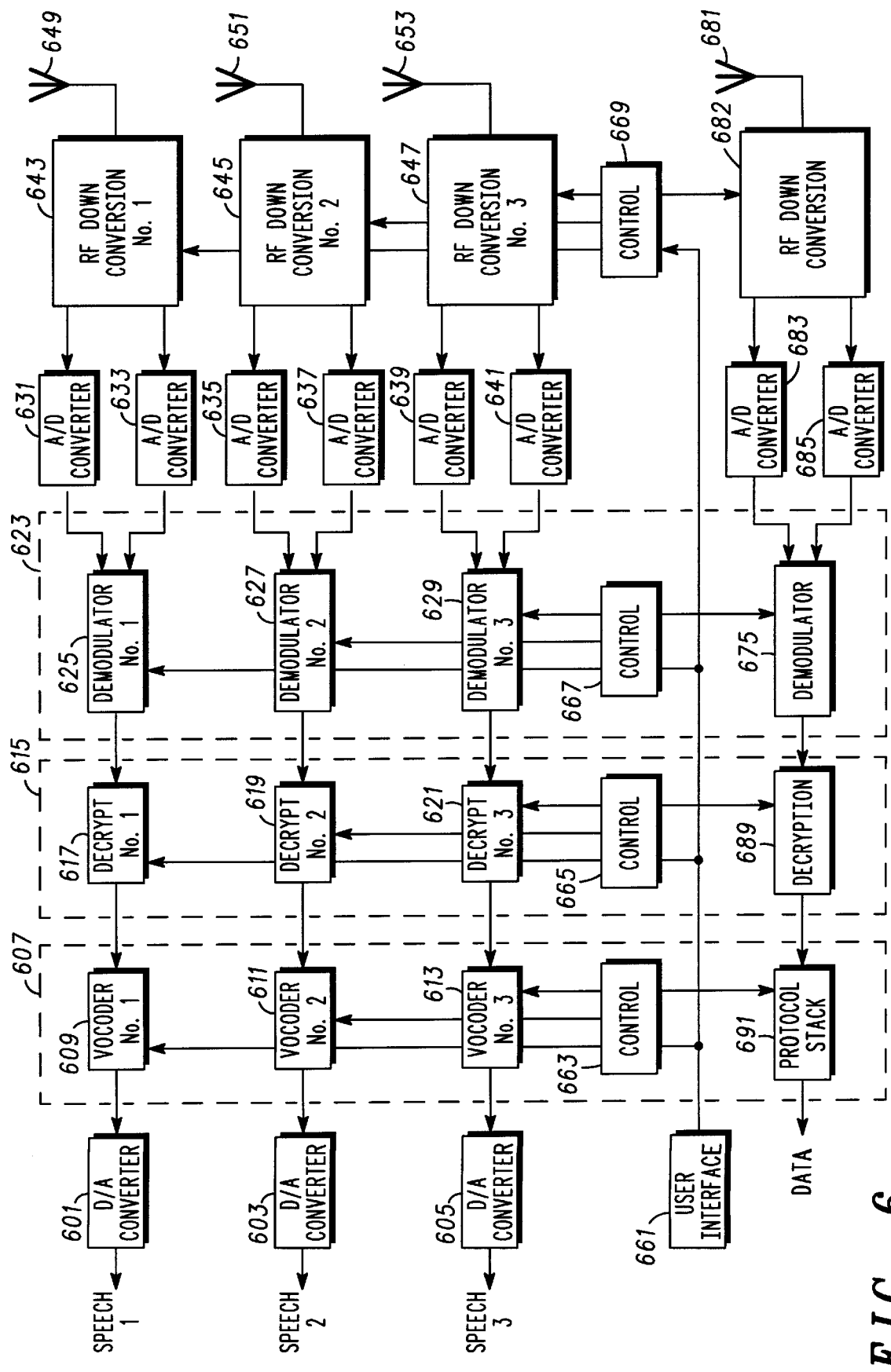
FIG. 6 is a block diagram of a receive path of a second radio in accordance with the invention.

FIG. 6 illustrates a multi-channel receiver in accordance with the invention for the simultaneous reception of a plurality of waveforms. In the arrangement shown four waveforms that may be simultaneously received over four rf channels. Those skilled in the art will appreciate that any number of waveforms may be simultaneously received and processed by varying the number of channel paths from the four shown. The four rf channels are each similar to the single channel transceiver path of FIG. 3. RF signals for the speech channels are received over the antennas 649, 651, 653. RF down-converters 643, 645, 647, respectively. The outputs of the down converters 643, 645, 647 are respectively applied to analog to digital converter pairs 631, 633; 635, 637; 639, 641. The outputs of the digital to analog converter pairs are provided to processors 623, 615, 607 that provide demodulation functions 625, 627, 629; decryption functions 617, 619, 621 and vocoder functionality 609, 611, 613. The digital outputs of processor 607 are converted into speech signals by digital to analog converters 601, 603, 605. A user interface 661 is used to provide control information relative to control function 663, 665, 667 of processors 607, 615, 623 whereby waveform software is selected.

The receiver of FIG. 6 may also process data signals. Data signals are received over antenna 681 and provided to rf down converter 682. Down converter 682 is coupled to analog to digital converter pair 683, 685. The output of digital to analog converter pair 683, 685 is coupled to demodulator function 687, decryption function 689 and a protocol stack 691. The output of the protocol stack 691 is a received digital data output.

Figure 7:
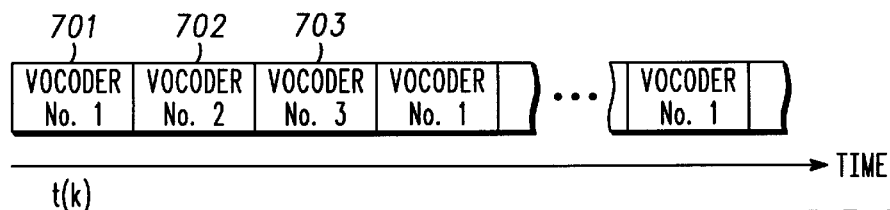
FIG. 7 illustrates the tasks performed by one of the transmit path processors of FIG. 5.

FIG. 7 illustrates the multi-tasking of a processor such as processor 607. Processor 607 multi-tasks all functions assigned to it for all the channels that are in operation. As illustrated, processor 607 performs the vocoder operations 701 for vocoder 1 at a time t(k) followed sequentially by vocoder operation 702 for vocoder 2 and then vocoder operations 703 for vocoder 3. The sequence repeats for as long as all three vocoder functions are required. In the event that fewer than three or more than three vocoder functions are to be utilized, the number and sequence of functions processed changes. In addition, processor 607 may perform other functions and those functions would be likewise inserted into the timeline shown.

Figure 8:
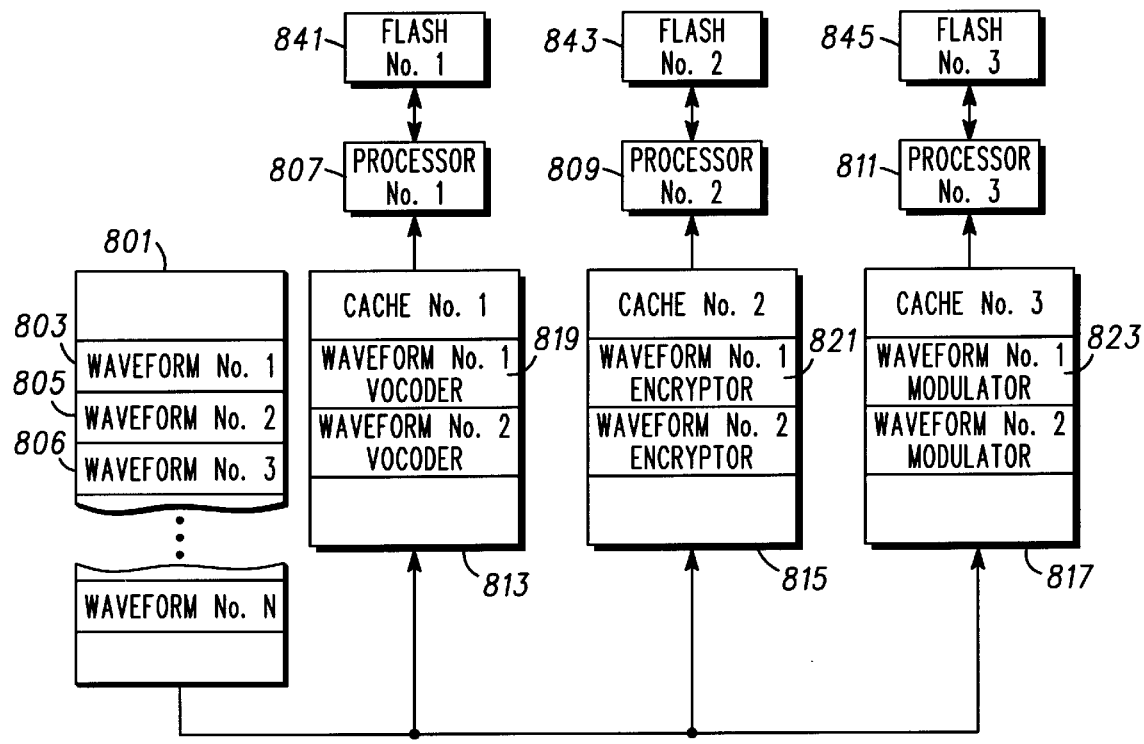
FIG. 8 is a block diagram of waveform software loading utilized in the second radio of FIGS. 5 and 6.
Figure 9:
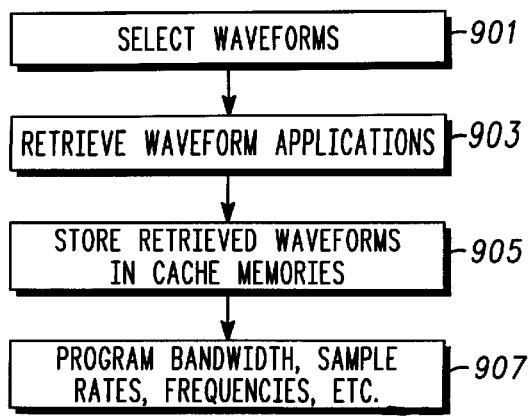
FIG. 9 is a flow diagram illustrating the setup process of a radio in accordance with the invention.

FIG. 8 illustrates an arrangement for use with processors which permits the rapid switching of waveform functionality. In accordance with an embodiment of the invention, the functionality of a processor is obtained from a collection of waveform software accessible to each processor. As shown in FIG. 8 three processors 807, 809, 811 each have associated therewith cache memory 813, 815, 817 respectively. A memory 801 accessible to each of processors 807, 809, 811 contains waveform software 803, 805, 806 for the various waveforms that may be processed. The memory 801 is for example a disk drive. To permit the rapid switching between waveforms, high-speed memory such as ram or random access memory is used for the caches 813, 815, 817. In operation, if a user of the system utilizing the processors selects a waveform to be utilized, the system processors 807, 809, 811 retrieve the appropriate waveform software from hard disk memory 801 and causes the appropriate software to be stored in the cache memories 813, 815, 817. Thus, for example, if waveform 1 is selected, waveform 1 vocoder software 819 is retrieved from memory 801 and stored in cache 813; waveform 1 encryption software 821 is retrieved from memory 801 and stored in cache 815; and waveform 1 modulator software 823 is retrieved from memory 801 and stored in cache 817. Similarly, software for other waveforms is retrieved from memory 801 and stored in caches 813, 815, 817 for other selected waveforms. Thus in accordance with one aspect of the invention, all of the constituent parts of a wave form application function are distributed to the processors that need to execute them. As shown in FIG. 8, no designation is made as to whether the system is operating as receiver or as transmitter. The operation of the system of FIG. 8 is the same whether operating as receiver, transmitter or transceiver. Operation of the system structure of FIG. 8 is shown in FIG. 9. In step 901, the user selects the waveform or waveforms that are to be used. In response to such selection, the system retrieves the waveform application routines from memory 801 as indicated at step 903. The waveform applications are stored in the cache memories 813, 815, 817 for the processors 807, 809, 811 as indicated at step 905. In step 905, the waveform application is disseminated to each processor cache as necessary to process the related waveform. At step 907, waveform programmable information such as bandwidth, sample rates and frequencies of operation are provided.

In operation of the system one or more of the waveform software is stored in dedicated memory which is rapidly accessed at power up of the radio. By adding flash memory 841, 843, 845 to each of the processors 807, 809, 811 respectively, the last number of waveforms used by the radio user prior to power down are stored in memory 841, 843, 845 and are instantly loaded at next power up. This permits the software radio to power up for substantially instantaneous use.

Figure 10:
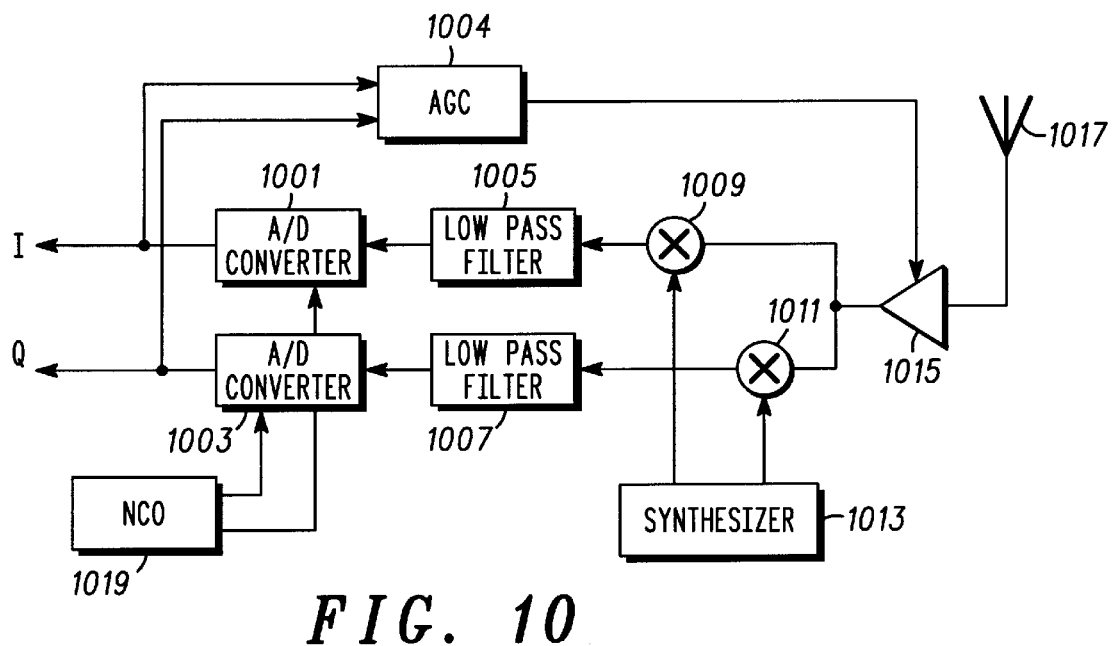
FIG. 10 is a diagram of the broadband rf receive circuit utilized in a radio in accordance with the invention.

FIG. 10 illustrates in block diagram form the rf receive function to support multiple waveforms. Signals are received at antenna 1017 and applied to lna 1015. The output of lna 1015 is applied to mixers 1009, 1011. Each mixer 1009, 1011 also has sine and cosine inputs, respectively from a programmable adjustable frequency synthesizer 1013. To support waveforms that may be at different frequency ranges, synthesizer 1013 has a broadband frequency range. The outputs of mixers 1009, 1011 are applied to adjustable low pass filters 1005, 1007. The outputs of low pass filters 1005, 1007 are applied to analog to digital converters 1001, 1003. The analog to digital converters 1001, 1003 utilize numerically controlled oscillator 1019 to determine the appropriate sampling rate for the waveform. In addition, the arrangement of FIG. 10 includes an adjustable automatic gain control circuit or function 1004. The various waveforms that may be processed have different acquisition and age requirements. Accordingly, it is necessary that the age parameters, such as loop bandwidth, and track and hold characteristics, are adjustable.

Figure 11:
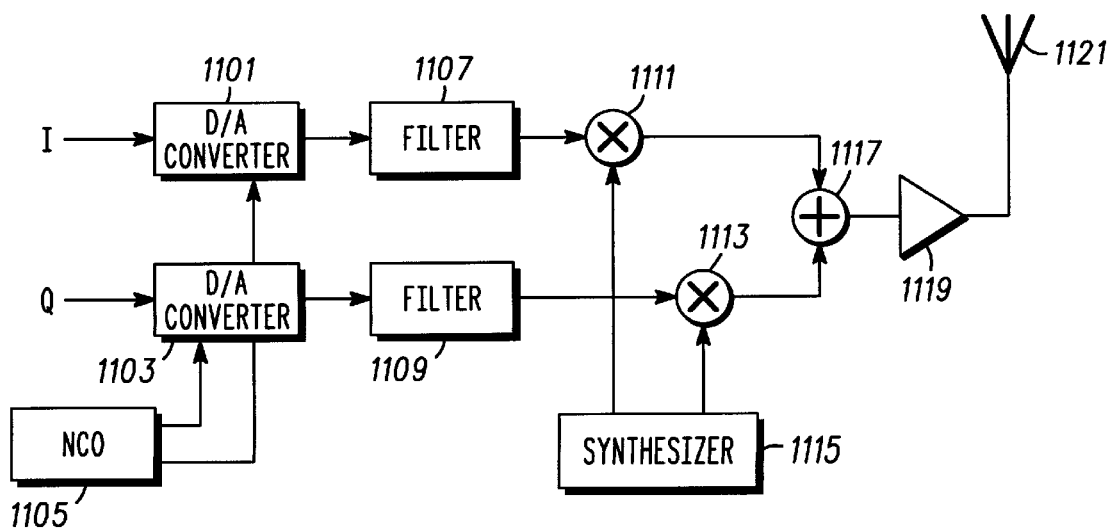
FIG. 11 is a diagram of the broadband rf up converter circuit utilized in a radio in accordance with the invention.

FIG. 11 illustrates in block diagram form the rf transmit function. Baseband quadrature signals I, Q are applied to digital to analog converters 1101, 1103 that are clocked by the numerically controlled oscillator (nco) 1105. The analog outputs are applied to programmable adjustable filters 1107, 1109. Filters 1107, 1109 are utilized to control spectral content of the output signal. Outputs of filters 1107, 1109 are fed to mixers 1111, 1113 that also receive inputs from a quadrature synthesizer 1115. To support waveforms that may be at different frequency ranges, synthesizer 1115 has a broadband frequency range. The outputs of mixers 1111, 1113 are in turn fed to summer 1117 that is coupled to power amplifier 1119. Power amplifier 1119 is adjustable such that the power output may be varied. Power amplifier 1119 is in turn coupled to antenna 1121.

The invention has been described in terms of various embodiments. It will be understood by those skilled in the art that various changes and modifications may be made to the embodiments without departing from the spirit or scope of the invention. It is not intended that the invention be limited in any way to the embodiments shown and described herein and it is intended that the invention be limited only by the claims appended hereto.

What is claimed is:

1. A transceiver comprising:

a transmitter comprising: an information receiving input receiving input digital information; an rf up-converter operable over a plurality of waveforms; and one or more processor means disposed between said input and said rf up-converter for operating in accordance with a plurality of predetermined first waveform software each first waveform software being associated with a corresponding one of a plurality of first waveforms such that said digital information is processed in accordance with selected ones of said plurality of predetermined first waveform software to produce digital output information representative of said input digital information for said rf up converter whereby one or more first waveforms of said plurality of first waveforms is produced;

a receiver comprising: a second waveform receiving input receiving one or more of a plurality of second waveforms; an rf down-converter coupled to said second waveform receiving input and operable over a plurality of second waveforms to produce received digital output information; an output; and said one or more second processor means being operable in accordance with a plurality of predetermined second waveform software; each said second waveform software being associated with a corresponding one second waveform of a plurality of second waveforms such that said received digital information is processed in accordance with selected ones of said plurality of predetermined second waveform software to produce received digital output information at said output;

a first memory having stored therein said plurality of predetermined first waveform software;

a second memory for receiving one or more first waveform software of said plurality of first waveform software for a corresponding number of selected ones of said plurality of first waveforms; said second memory receiving said one or more first waveform software from said first memory; and said second memory being coupled to said one or more processor means to provide said selected ones of said predetermined first waveform software to said one or more processor means;

a third memory having stored therein said plurality of predetermined second waveform software;

a fourth memory for receiving one or more second waveform software of said plurality of second waveform software for a corresponding number of selected ones of said plurality of second waveforms, said second memory receiving said one or more second waveform software from said third memory; and said fourth memory being coupled to said one or more processor means to provide said selected ones of said predetermined second waveform software to said one or more processor means.

2. A transceiver in accordance with claim 1, wherein:

said predetermined first waveform software comprises modulation software; and said predetermined second waveform software comprises demodulation software.

3. A transceiver in accordance with claim 2, wherein:

said predetermined first waveform software comprises encryption software; and said predetermined second waveform software comprises decryption software.

4. A transceiver in accordance with claim 1, wherein:

said predetermined first waveform software comprises modulation software; and said predetermined second waveform software comprises demodulation software.

5. A transceiver in accordance with claim 4, wherein:

said predetermined first waveform software comprises encryption software; and said predetermined second waveform software comprises decryption software.

6. A transceiver in accordance with claim 1, wherein:

said predetermined first waveform software comprises encryption software; and said predetermined second waveform software comprises decryption software.

7. A transceiver in accordance with claim 1, wherein:

said predetermined first waveform software comprises encryption software; and said predetermined second waveform software comprises decryption software.

8. A transceiver in accordance with claim 1, comprising:

a user interface operable to select said one or more of said plurality of first and second predetermined waveforms.

9. A transceiver in accordance with claim 1, comprising:

a user interface operable to select said one or more of said plurality of first and second predetermined waveforms.

10. A transceiver in accordance with claim 1, comprising:

said second memory comprises one or more cache memory portions, each corresponding to corresponding one of said one or more processor means.

11. A transceiver in accordance with claim 1, wherein:

said one more processor means are operable to generate pluralities of said first and second waveforms.

12. A transceiver in accordance with claim 1, comprising:

a third memory portion for storing last used waveform software for use by said one or more processor means at time of processor power up.

* * * * *

UNITED STATES PATENT AND TRADEMARK OFFICE
CERTIFICATE OF CORRECTION

PATENT NO. : 6,181,734 B1
DATED : January 30, 2001
INVENTOR(S) : Keith Charles Palermo Page 1 of 1

It is certified that error appears in the above-identified patent and that said Letters Patent is hereby corrected as shown below:

<u>Column 1,</u>
Line 2, insert -- This invention was made with Government support under contract F30602-95-C-0026 awarded by the air Force. The Government has certain rights in this invention. --

<u>Column 8, claim 10,</u>
Line 36, delete "comprising:" and replace with -- wherein: --.

Signed and Sealed this

Nineteenth Day of March, 2002

Attest:

JAMES E. ROGAN
*Director of the United States Patent and Trademark Office*

*Attesting Officer*